United States Patent [19]

Turpeinen

[11] Patent Number: 4,738,292
[45] Date of Patent: Apr. 19, 1988

[54] TREE DELIMBING APPARATUS

[76] Inventor: Robert W. Turpeinen, Route 1, Box 198, Pelkie, Mich. 49958

[21] Appl. No.: 36,994

[22] Filed: Apr. 10, 1987

[51] Int. Cl.⁴ .............................................. B27L 1/00
[52] U.S. Cl. .................................... 144/343; 144/2.2; 144/208 J
[58] Field of Search .................... 144/2 Z, 208 J, 343

[56] References Cited
U.S. PATENT DOCUMENTS
4,061,166 12/1977 Larson ................................. 144/2 Z Primary Examiner—W. Donald Bray
Attorney, Agent, or Firm—Reising, Ethington, Barnard, Perry & Milton

[57] ABSTRACT

A tree delimbing apparatus (10) for removing tree branches, bark, and leaves. Tree stems are extended transversely over a shaft (12) where a sheet-like thread (22) conveys the tree stems longitudinally along the shaft (12). Chains (26) are attached to the shaft (12) and bars (28) are disposed between adjacent turns of the sheet-like thread (22) for removing bark and branches while urging the tree stems to move transversely across the shaft (12).

20 Claims, 2 Drawing Sheets

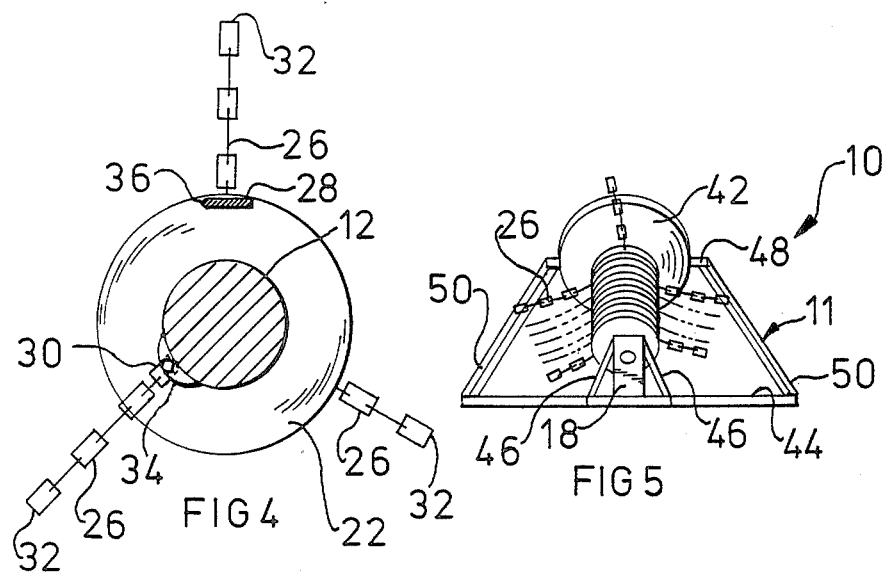
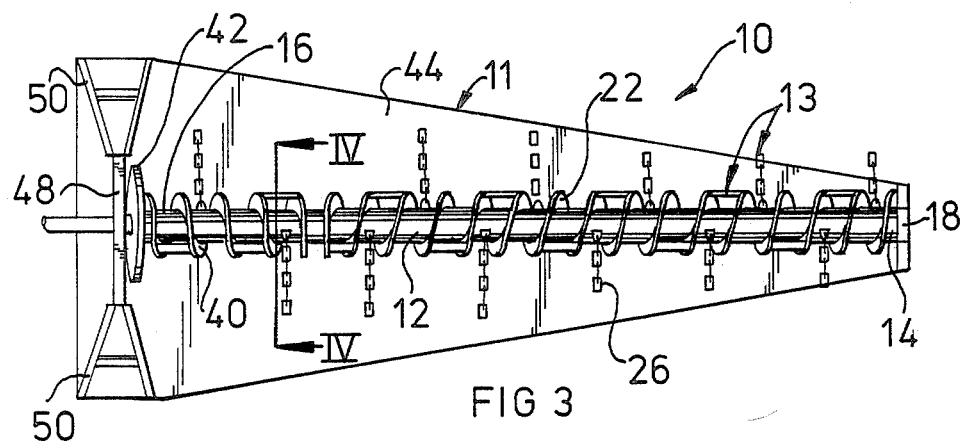
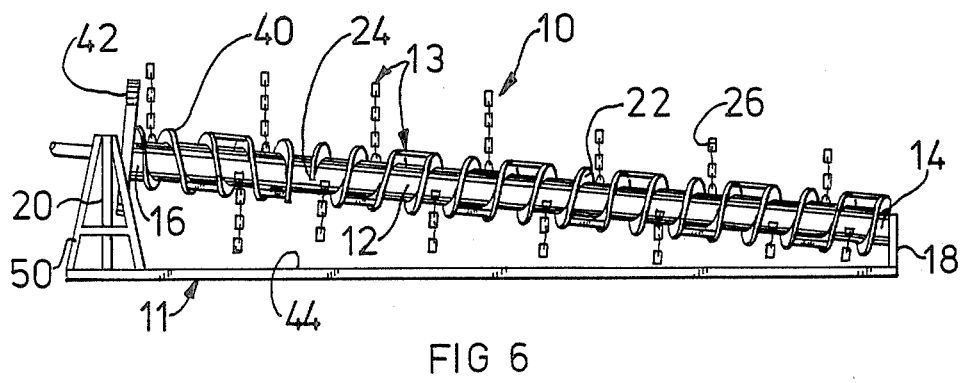

TREE DELIMBING APPARATUS

TECHNICAL FIELD

The subject invention is to be utilized in the removal of branches, leaves, and bark from freshly cut tree stems.

BACKGROUND AND PRIOR ART

In the lumber industry, forest workers enter a forest and cut down live tree stems, after which it is desirable to remove the leaves and branches before cutting the tree stems to a uniform length.

Examples of apparatus for delimbing tree stems are shown in the patents to Brisson U.S. Pat. No. 4,214,616 issued July 29, 1980 and Laforge et al U.S. Pat. No. 3,948,299 issued Apr. 6, 1976. These patents disclose conveying tree stems transversely across a rotating shaft during the delimbing operation. The Brisson '616 patent discloses attaching a plurality of radially extendable flail members, e.g., chains, to the rotating shaft for delimbing the tree stems. The Laforge et al '299 patent discloses attaching sheet-like members extending radially outwardly from the rotating shaft, with bars extending between the sheet-like members for delimbing.

The prior art delimbing apparatus are comprised of complex mechanisms requiring a plurality of intricate moving parts. Accordingly, a delimbing apparatus of simple construction and minimal parts which will effectively delimb a large quantity of tree stems is welcomed in the art.

SUMMARY OF THE INVENTION AND ADVANTAGES

The subject invention provides a support means, and a conveying means moveably supported on an axis by the support means for receiving tree stems extending transversely across the axis of the conveying means and placing forces on such stems to move the same simultaneously transversely and axially of the conveying means and for delimbing while being moved at an angle spaced between the axis of the stem and the axis of the conveying means.

A particular advantage of this invention over the prior art is that a large cluster, or group of variably sized tree stems can be delimbed at one time. As the tree stems are moved both transversely and longitudinally across the rotating conveying means, the tree stems are efficiently and effectively delimbed. The combination of delimbing and conveying jostles and rotates each individual tree stem thereby allowing the delimbing means to contact all sides of the tree stems and remove the majority of branches. Additionally, the subject invention is easily manufactured from low cost materials and without a plurality of intricate moving parts.

FIGURES IN THE DRAWINGS

Other advantages of the present invention will be readily appreciated as the same becomes better understood by reference to the following detailed description when considered in connection with the accompanying drawings wherein:

FIG. 3 is a top view of the preferred embodiment of the subject invention;

FIG. 4 is a cross-sectional view of the subject invention taken along line IV—IV of FIG. 3;

FIG. 5 is an end view of the subject invention; and

FIG. 6 is a side view of the subject invention.

DETAILED DESCRIPTION OF THE DRAWINGS

Figure 2:
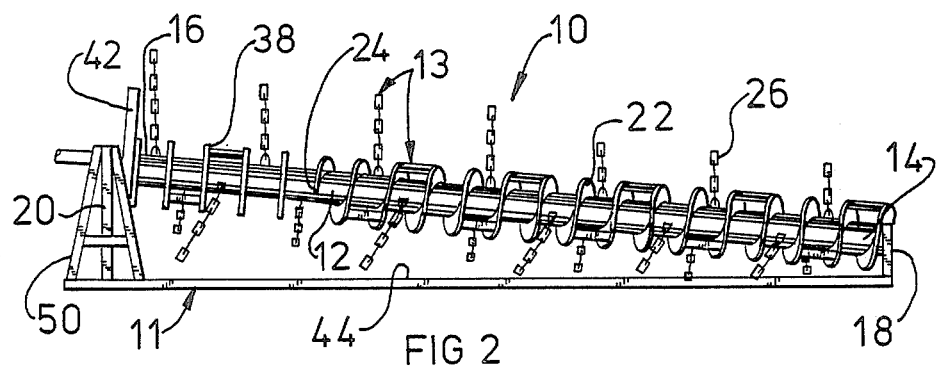
FIG. 2 is a side view of another embodiment of the subject invention.

An apparatus for removing tree branches is generally shown at 10. The apparatus 10 comprises a conveying means, generally indicated at 11, moveably supported on an axis by a support means, generally indicated at 13. The support means 11 rotatively supports the conveying means 13 along its longitudinal axis. Tree stems are manually extended transversely across the axis of the conveying means 13. Forces are placed upon the tree stems by the rotating conveying means 13 to move the tree stems simultaneously transversely and axially of the conveying means 13. As the tree stems are moved transversely and axially across and along the conveying means 13, they are delimbed and moved at an angle spaced between the axis of the stem and the axis of the conveying means 13. That is to say, the resultant direction of the tree stems as they are conveyed by the conveying means 13 is caused by simultaneous transverse and axial movement. This resultant direction extends at a slanting angle between the transverse and axial movement directions. In other words, the tree stems move both transversely across the conveying means 13 and axially along the conveying means 13 to result in a diagonal movement over the conveying means 13.

The conveying means 13 includes an elongated cylindrical shaft 12 having first and second ends 14, 16, respectively. The first 14 and second 16 ends of the shaft 12 are supported by the support means 11 for axial rotation, such as with bearings or the like. The conveying means includes at least one sheet-like thread 22 extending along the shaft 12 from the first end 14 toward the second end 16. The sheet-like thread 22 terminates adjacent the second end 16 of the shaft 12 at an exit end 24, i.e., the thread 22 ends or ceases at the exit end 24 which is spaced from the second end 16 of the shaft 12. The thread 24 is helically wound about the shaft 12 so that as the shaft 12 rotates, the tree stems, which extend transversely across the shaft 12, are transported toward the second end 16 of the shaft 12. Said another way, the tree stems are positioned crosswise over the shaft 12 near the first end 14, and rest between the spaced turns of the thread 22 whereby rotation of the shaft 12 causes the thread 22 to transfer or move the tree stems along the shaft 12 toward the second end 16.

Disposed along the shaft 12 and spaced among the thread 22 are delimbing means 26, 28 for removing branches from the tree stems and urging the tree stems to move transversely of the axis of the conveying means 13. The subject invention 10 is particularly effective in removing branches from tree stems with the delimbing means 26, 28 comprising a plurality of flexible members 26 disposed along and around the shaft 12. The flexible members 26 have one end 30 attached to the shaft 12, and are radially extendable to a distal end 32 under centrifugal force, as shown in FIG. 4. In other words, the flexible members 26 extend radially outwardly upon rotation of the shaft 12. As the shaft 12 rotates and the flexible members 26 are radially extended, the flexible members 26 contact the tree stems placed across the shaft 12 and flail against the tree stems to remove the leaves, bark, and branches, and urge the tree stems to transport transversely across the axis of the conveying means 13. Said another way, the flexible members 26 flog against the tree stems to remove the branches and bark and to move the tree stems in a direction perpendicular to the axis of the conveying means 13. The flexible members 26 are found particularly effective when comprised of a series of joined links, i.e., chains. The flexible members 26 are preferably spaced apart in 120 degree increments.

Each flexible member 26 is attached to the shaft 12 by a connector means 34, as shown in FIG. 4. The connector means 34 is fixedly mounted to the shaft 12 and provides a releasable connection between the flexible member 26 and the shaft 12. The advantage of releasably connecting a flexible member 26 to the shaft 12 is realized when a flexible member 26 becomes broken or otherwise inoperative and replacement is necessary. The preferred method of accomplishing a releasable connection is to provide both the connector means 34 and the one end 30 of the flexible member 26 with an aperture through which a fastener, e.g. a bolt and nut, can be passed. That is to say, a fastener is passed through both an aperture in the connector means 34 and a corresponding aperture in the one end 30 of the flexible member 26. When damage occurs to any flexible member 26, the fastener is removed and a new flexible member 26 is easily installed with minimum effort.

Figure 1:
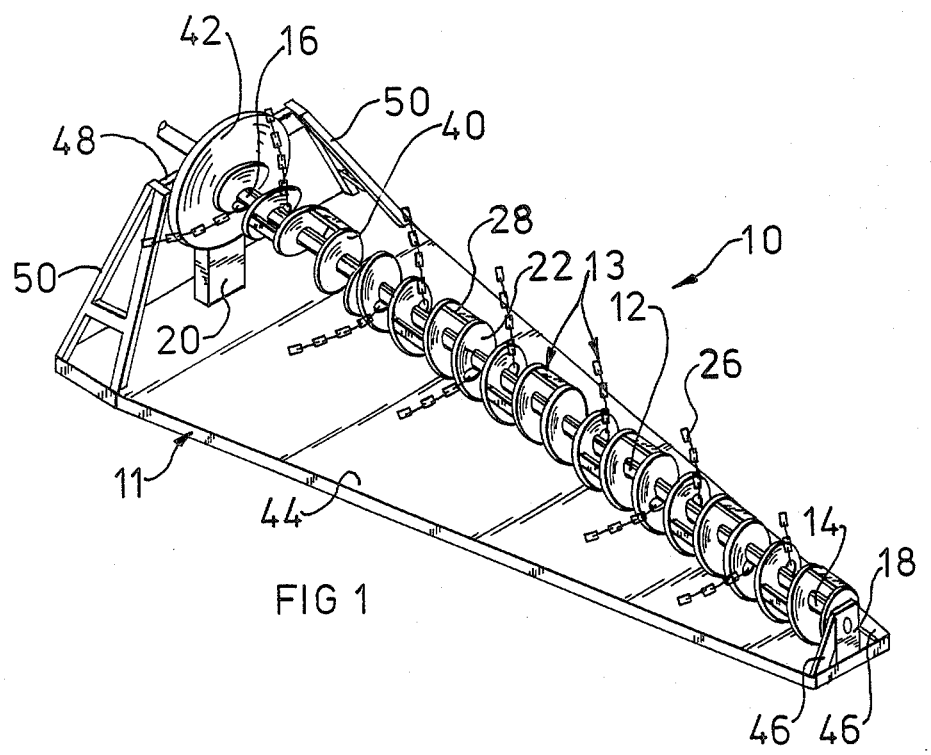
FIG. 1 is a perspective view of a preferred embodiment of the subject invention.

The delimbing means 26, 28 includes a plurality of bars 28 disposed among adjacent turns of the thread 26. The bars 28 are fixed to the thread 26 near the outer extremity thereof. In other words, the bars 28 are attached adjacent the crest of two consecutive turns of the thread 26, as shown in FIGS. 1 and 4. As the shaft 12 rotates, the bars 28 are brought into contact with the tree stems resting crosswise over the shaft 12, thereby severing branches extending toward the shaft 12 and urging the tree stems to move in a direction transversely of the axis of the conveying means 13. Additionally, the bars 28 perform the function of momentarily raising the tree stems contacted by each bar 28 higher above the shaft 12 than the adjacent tree stems so that all the tree stems are jostled and rotated into new orientations for more effective delimbing.

As shown in FIG. 4, the bars 28 are generally rectangular in cross-section to present a narrow profile for effectively cutting through tree branches. Each bar 28 has a leading edge 36 which is always first to contact the tree stems due to the rotation of the shaft 12. The leading edge 36 is pointed for increased severing efficiency. Stated another way, the leading edge 36 is wedge-shaped, or knife-shaped, for effectively cutting branches away from the tree stems. The bars 28 are preferably spaced apart in 120 degree increments.

The subject invention 10 includes a retardation means 38, 40 disposed on the shaft 12 between the exit end 24 of the thread 22 and the second end 16 of the shaft 12 for retarding the longitudinal transportation of tree stems along the shaft 12 between the exit end 24 and the second end 16. In other words, the retardation means 38, 40 is included in the subject invention 10 for arresting the longitudinal movement of the tree stems along the shaft 12 between the exit end 24 and the second end 16. By including retardation means 38, 40 on the rotating shaft 12, tree limbs are prevented from accumulating together at the second end 16, which would frustrate the delimbing process. The retardation means 38, 40 does not affect the transverse movement of the tree stems across the axis of conveying means 13.

One embodiment of the retardation means 38, 40 comprise at least one sheet-like member 38 extending radially outwardly from the shaft 12 between the second end 16 and a position adjacent the exit end 24 of the thread 22. The sheet-like member 38 can resemble an annulus, or disk-like plate, which projects radially from the shaft 12. As shown in FIG. 2, a plurality of sheet-like or disc members 38 can be employed between the exit end 24 of the thread 22 and the second end 16 of the shaft 12.

An alternative embodiment of the retardation means 38, 40 comprise at least one sheet-like member 38 including at least one return thread 40 which is helically wound around the shaft 12 for moving the tree stems longitudinally along the shaft 12 from the second end 16 toward the exit end 24 of the first thread 22. That is to say, the return thread 40 is helically wound in the opposite direction as the first mentioned thread 22 such that rotation of the conveying means 13 will transport the tree stems along the shaft 12 from the second end 16 toward the exit end 24.

It will be appreciated that the delimbing means 26, 28 may be disposed among the sheet-like member 38 or return thread 40 of the retardation means 38, 40 if so desired.

As shown in FIGS. 1, 2 and 5, the support means 11 supports the shaft 12 at an inclined angle relative to the horizontal so that the second end 16 is maintained at a higher elevation than the first end 14. The inclined shaft 12 facilitates the jostling and rotating of the tree stems as they are transported along the conveying means 13. The incline induces some of the tree stems to roll back downward, toward the first end 14 of the shaft 12, while other tree stems are jostled into new positions and orientations thereby allowing for more effective scourging by the delimbing means 26, 28.

In the embodiment described above wherein the shaft 12 is maintained at an inclined angle relative to the horizontal, it is desirable to increase the individual length of each flexible member 26 to account for the increasing elevation of the shaft 12 from the first end 14 to the second end 16. In this manner, the flexible members 26 are individually increased in length from a minimum length adjacent the first end 14 of the shaft 12 to a maximum length adjacent the exit end 24 of the thread 22. If flexible members 26 are included among the retardation means 38, 40, then the maximum length of the flexible members 26 will be achieved adjacent the second end 16 of the shaft 12. The length of each flexible member 26 corresponds to the elevation of the shaft 12 whereby the distal end 32 of each flexible member 26 will just barely contact or not contact the underneath ground support as they are rotated with the shaft 12 and radially extended under centrifugal acceleration.

The subject invention 10 includes an energy storage device 42 for absorbing mechanical energy during increasing angular velocities of the conveying means 13 and delivering mechanical energy during decreasing angular velocities of the conveying means 13. As shown in FIGS. 1, 2, 3, 5 and 6, the energy storage device 42 takes the form of a flywheel, i.e., inertia of a mass.

The subject invention 10 is further characterized by the support means 11 comprising a first support 18, upholding the first end 14 of the shaft 12, and a second support 20, upholding the second end 16 of the shaft 12. The support means 11 also includes a base platform 44 for providing a flooring from which the supports 18, 20 extend. As shown in FIGS. 1 and 3, the base platform 44 is substantially triangular in shape with the width across the base platform 44 uniformly increasing from a minimum adjacent the first support 18 to a maximum adjacent the second support 20.

As illustrated in FIGS. 1, 2, 3, and 5, the first support 18 includes first brace members 46 on either side for providing structural rigidity to the first support 18. The first brace members 46 attach to the upper end of the first support 18 and extend outwardly and downwardly therefrom to a perch on the base platform 44. Likewise, the second support 20 includes second brace members 48, 50 for providing structural rigidity to the second support 20. The second brace members 48, 50 comprise a header 48 disposed horizontally over the second support 20, and A-frames 50 which extend outwardly and downwardly from either end of the header 48 to a perch on the base platform 44.

Although not illustrated in the Figures, the subject invention 10 may be equipped with a protective shield or housing about the rotating conveying means 13 to protect and guard nearby workers from any projectiles resulting from the delimbing operation.

The subject invention 10 is useful in the lumber industry wherein forest workers, or lumber jacks, cut down live tree stems in the woods and forests. After the tree stems have been cut down, the leaves and branches are removed before the tree stems are cut to a uniform length and stacked on a truck for transportation out of the forest.

In operation, the conveying means 13 is supported upon its axis by the support means 11. An engine or motor rotates the conveying means 13. A cluster or group of freshly cut tree stems are placed transversely across the axis of the conveying means 13 adjacent the base of the tree stem trunks, near the first end 14 of the shaft 12. As the conveying means 13 rotates, the tree stems are delimbed and simultaneously urged to move in a direction at an angle spaced between the axis of the stems and the axis of the conveying means 13. In other words, as the tree stems are delimbed, they are induced to move both longitudinally and transversely of the axis of the conveying means 13 thereby resulting in a diagonal direction. Longitudinal transportation of the tree stems along the axis of the conveying means 13 is provided by helically winding at least one sheet-like thread 22 in spaced turns about the conveying means 13. Transverse movement of the tree stems across the axis of the conveying means 13 is provided by disposing spaced delimbing means 26, 28 among the sheet-like thread 22 for simultaneously delimbing and urging the tree stems to move in the transverse direction.

Improved delimbing is achieved by supporting the conveying means 13 at an inclined angle relative to the horizontal, and then extending the tree stems transversely across the axis of the conveying means 13 adjacent the lower end of the conveying means 13 thereby elevating the tree stems during the longitudinal transportation along the axis of the conveying means 13. The inclined angle of the conveying means 13 causes some of the tree stems to roll back downward, toward the lower end of the conveying means 13 while other tree stems are jostled into new positions and orientations thereby allowing for more effective deliming.

Additionally, the delimbing operation can be more effectively performed by moving the ends of the tree stems completely across the axis of the conveying means 13 and allowing the tree stems to fall to a ground support, or the base platform 44, and then moving the tree stems in a second opposite transverse direction under the axis of the conveying means 13. This allows any remaining tree branches or bark to be removed.

The invention may be operated by providing a machine, such as a "skidder", for collectively grasping the base of the tree stems and pulling them transversely across the conveying means 13, either with the direction or against the direction of the urging of the delimbing means 26, 28. Such a machine is most helpful in moving the tree stems underneath the axis of the conveying means 13 in the second opposite transverse direction as described above.

The invention has been described in an illustrative manner, and it is to be understood that the terminology which has been used is intended to be in the nature of words of description rather than of limitation.

Obviously, many modifications and variations of the present invention are possible in light of the above teachings. In is, therefore, to be understood that within the scope of the appended claims, wherein reference numerals are morely for convenience and are not to be in any way limiting, the invention may be practiced otherwise than as specifically described.

What is claimed is:

1. A tree delimbing apparatus (10) comprising a support means (11) and a conveying means (13) moveably supported on an axis by said support means (11) for receiving tree stems extending transversely across the axis of said conveying means (13) for placing forces upon such stems to move same simultaneously transversely and axially of said conveying means (13) and for delimbing while being moved at an angle spaced between the axis of the stem and the axis of said conveying means (13).

2. An apparatus (10) as set forth in claim 1 wherein said conveying means (13) includes a cylindrical shaft (12) having first (14) and second (16) ends, said support means (11) rotatively supporting said shaft (12) adjacent each of said ends (14, 16), said shaft (12) including at least one sheet-like thread (22) extending along said shaft (12) from said first end (14) to a termination near said second end (16), said thread (22) helically wound about said shaft (12) in spaced turns so that rotation of said shaft (12) causes longitudinal transportation of the tree stems along said shaft (12) from said first end (14) toward said second end (16).

3. An apparatus as set forth in claim 2 wherein said conveying means (13) further includes a delimbing means (26, 28) spaced among said thread (22) for removing branches from tree stems extending transversely over said shaft (12) and for urging the tree stems to move in a direction transversely of the axis of said conveying means (13).

4. An apparatus (10) as set forth in claim 3 further characterized by said delimbing means (26, 28) including a plurality of flexible members (26) disposed along said shaft (12), and having one end (30) attached to said shaft (12) and radially extendable to a distal end (32) under centrifugal force to flail against the tree stems for removing leaves, bark, and branches and for urging the tree stems to move in a direction transversely of the axis of said conveying means (13).

5. An apparatus as set forth in claim 4 further characterized by said flexible members (26) each comprising a chain attached to said shaft (12).

6. An apparatus (10) as set forth in claim 4 further characterized by said thread (22) terminating at an exit end (24) in spaced relationship to said second end (16) of said shaft (12), and including retardation means (38, 40) disposed between said exit end (24) of said thread (22) and said second end (16) of said shaft (12) for retarding transportation of the tree stems longitudinally along said shaft (12) between said exit end (24) of said thread (22) and said second end (16).

7. An apparatus (10) as set forth in claim 6 further characterized by said retardation means (38, 40) comprising at least one sheet-like member (38) extending radially from said shaft (12) between said second end (16) and a position adjacent said exit end (24) of said thread (22).

8. An apparatus (10) as set forth in claim 7 further characterized by said sheet-like member (28) including at least one return thread (40) helically wound around said shaft (12) for moving tree stems along said shaft (12) from said second end (16) toward said exit end (24) of said first thread (22).

9. An apparatus (10) as set forth in any one of claims 2, 3 or 6 further characterized by said support means (11) supporting said shaft (12) at an inclined angle relative to the horizontal so that said second end (16) is maintained at a higher elevation than said first end (14).

10. An apparatus (10) as set forth in claim 9 further characterized by said flexible members (26) increasing in length from a minimum length adjacent said first end (14) to a maximum length adjacent said exit end (24) to account for the increase in elevation of said shaft (12) from said first end (14) to said second end (16).

11. An apparatus (10) as set forth in claim 10 further characterized by including connector means (34) for releasably attaching each of said flexible members (26) to said shaft (12) to provide quick replacement of said flexible members (26).

12. An apparatus (10) as set forth in claim 9 further characterized by said delimbing means (26, 28) including a plurality of bars (28) disposed among adjacent turns of said first thread (22) at the outer extremity thereof for contacting tree branches as said shaft (12) rotates to sever tree branches and urge the tree stems to move in a direction transversely of the axis of said conveying means (13).

13. An apparatus (10) as set forth in claim 12 further characterized by said bars (24) including a pointed leading edge (32) for severing a tree branch as said shaft (12) rotates.

14. An apparatus (10) as set forth in claim 13 further characterized by including an energy-storage device (42) to absorb mechanical energy during increasing angular velocities of said conveying means (13) and to deliver mechanical energy during decreasing angular velocities of said conveying means (13).

15. An apparatus (10) as set forth in claim 12 further characterized by said support means (11) comprising a first support means (18) supporting said first end (14) and a second support means (20) supporting said second end (16), a base platform (44) substantially triangular in shape with the width across said base platform (44) uniformly increasing from a minimum adjacent said first support (18) to a maximum adjacent said second support (20) for providing a flooring upon which said support means (11) extends.

16. A method for delimbing tree stems comprising the steps of supporting a conveying means (13) upon an axis by a support means (11), axially rotating said conveying means (13), and extending tree stems transversely across the axis of said conveying means (13), and delimbing the tree stems while the tree stems are urged in a direction at an angle spaced between the axis of the stem and the axis of said conveying means (13).

17. A method as set forth in claim 16 further characterized by disposing at least one sheet-like thread (22) helically wound about said conveying means (13) in spaced turns so that axial rotation of said conveying means (13) causes longitudinal transportation of the tree stems along the axis of said conveying means (13).

18. A method as set forth in claim 17 further characterized by disposing spaced delimbing means (26, 28) among said thread (22) for removing branches from tree stems extending transversely over said conveying means (13) and urging the tree stems to move in a direction transversely of the axis of said conveying means (13).

19. A method as set forth in claim 18 further characterized by supporting said conveying means (13) at an inclined angle relative to the horizontal, and extending tree stems transversely across the axis of said conveying means (13) adjacent the lower end of said conveying means (13) for elevating the tree stems during longitudinal transportation along the axis of said conveying means (13).

20. A method as set forth in claim 19 further characterized by moving the ends of the tree stems completely across the axis of said conveying means (13) and allowing same to fall to a ground support, and moving the tree stems in a second opposite transverse direction under the axis of said conveying means (13) for further delimbing.

* * * * *